Dec. 10, 1963   F. S. L. TISSOT-DUPONT   3,113,444
GAS LIGHTER
Filed Aug. 22, 1961

Inventor
FRANÇOIS SIMON LUCIEN TISSOT-DUPONT

By Toulmin & Toulmin
Attorneys

United States Patent Office 3,113,444
Patented Dec. 10, 1963

3,113,444
GAS LIGHTER
François Simon Lucien Tissot-Dupont, Paris, France, assignor to Society S. T. Dupont, Paris, France, a body corporate of France
Filed Aug. 22, 1961, Ser. No. 133,262
Claims priority, application France Aug. 25, 1960
5 Claims. (Cl. 67—7.1)

The present invention relates to a liquefied gas lighter of the type in which the opening of the valve allowing the outflow of the gas and the actuation of the milled nut generating the ignition spark for the gas are controlled by a single motion, through a common control member such as a knob, a lever, the cover of the lighter or one or several driving devices.

The object of the present invention is to produce this single control member in a particularly simple and reliable way and the lighter according to the invention, is characterized in that it includes a cam which controls the opening of the valve and is simultaneously driven in rotation with the milled nut.

According to a preferred form of embodiment, the cam is constituted by a disk mounted on the axis of the milled nut (for instance the driving member of the milled nut) and provided with a flat extending on about 90°. This cam cooperates with a pivoted lever subjected at one end to the action of a spring: this spring secures, through the other end of the lever, the closing of the valve when the flat of the cam comes into contact with the lever and is compressed by the cam, thereby allowing the opening of the valve, when the circular portion of the valve comes into contact with the lever which is tilted round its axis. The closing of the valve, after the use, is obtained through a new rotation of the cam, in the same direction or in the opposite direction, to bring back the flat into contact with the lever.

The flat provided on the cam and acting as a stop, secures the back-motion of the valve and keeps it in closed position. The same result can, nevertheless, be obtained with a cam having any profile in its lower portion by associating said cam with abutments to limit its stroke; these abutments could also be used with cams provided with a flat. When abutments are used, the cam should preferably be driven through a friction device or a system disconnectable at the end of the stroke of the cam.

By way of example, several forms of embodiment of a lighter according to the invention are described hereafter and illustrated in the annexed drawing.

Figure 1:
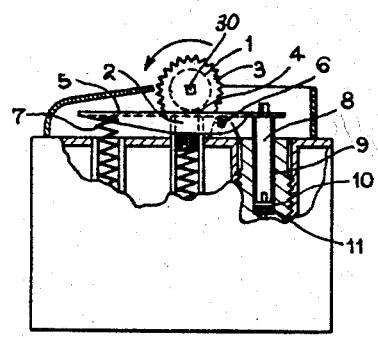
FIGURES 1 and 2 illustrate partly in a longitudinal cross-elevation a first form of a lighter according to the invention, with a closed and an opened valve, respectively.
Figure 3:
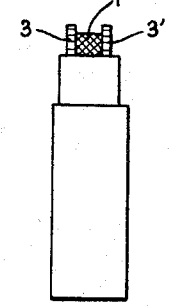
FIGURE 3 is a cross-elevation.
Figure 2:
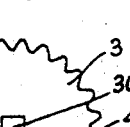
Figure 4:
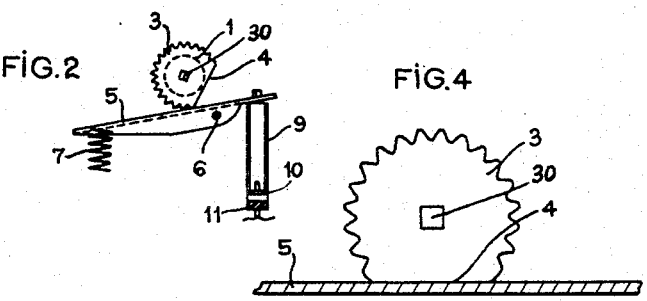
FIGURE 4 shows in elevation, at a greater scale, a driving member used as a control cam.

In the form of embodiment illustrated in FIGURES 1 to 4 inclusive, the milled nut 1 of the lighter which is carried by an axle 30 trunnioned on the body of the lighter and which cooperates with the flint 2, includes two driving disks 3, 3', which form cams and therefore are each provided with a flat 4 extending on about 90°. A lever 5 pivoted in 6 on the stationary part of the mechanism bears at its left end, upon a spring 7 which urges the lever to swing to the right, so that its other end presses upon the tubular burner 8 sliding in a bore 9 and integral with the valve member 10 of the valve and brings about the closing of this valve by compressing the joint 11. If the milled nut is rotated in the direction of the arrow, the flats 4 of the driving members 3 release the lever 5 which is lowered and thereby compresses the spring 7 by the circular portion of the cam (see FIG. 2) and releases the burner 8 and the valve member 10, allowing the discharge of the gas which is lighted by the spark produced by the milled nut contacting the flint 2. As usually the rotation of the milled nut is less than 270°, this milled nut stops before the return of the flats 4 in their initial position in FIGURE 1, so that the valve remains opened and the gas lighted. To blow out the flame, it suffices to rotate the milled nut in either direction to bring the flats 4 into contact with the lever 5.

Figure 5:
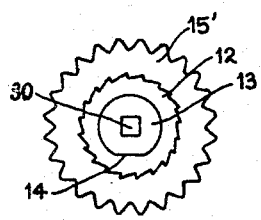
FIGURES 5 and 6 illustrate, in elevation and axial section respectively, another form of embodiment of the cam.
Figure 6:
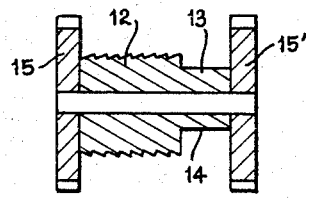

In the form of embodiment of FIGURES 5 and 6, the cam is integral with the milled nut which has, at one end, a smooth cylinder 13 upon which is provided a flat 14: the driving is obtained as in the previous case, by means of two knurled driving disks 15, 15', which have no flats.

Figure 7:
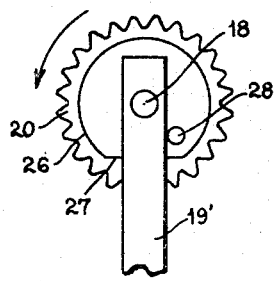
FIGURES 7 and 8 are corresponding views of a third form of embodiment.
Figure 8:
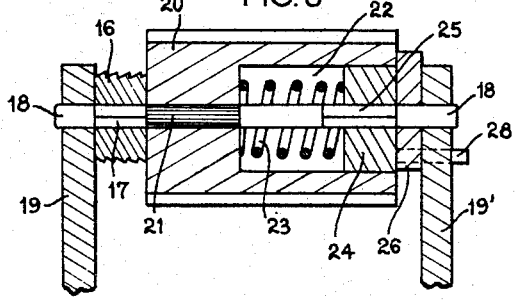

In the form of embodiment of FIGURES 7 and 8, the stroke of the control milled nut is limited by an abutment and the cam is frictionally driven in rotation. Therefore, the milled nut 16 is set upon a portion 17, having a hexagonal or square section, of the axis 18 trunnioned in two studs 19, 19', while a large knurled driving cylinder 20 is engaged on a grooved portion 21 of this axis. A blind hole, 22, provided in the cylinder 20, houses a spiral spring 23 which urges a friction disk 24, mounted on a second hexagonal or square portion 25 of the axis 18, against a cam 26 provided with a flat and loose mounted on the cylindrical end of the axis 18. A teat 28 provided on the outer face of the cam 26 is, when this cam is at rest (see FIGURE 7) into contact with one of the sides of the stud 19' and, after a rotation of about 90°, abuts against the upper part of this stud and stops, leaving the valve in the opened position. If the spark has not flown during this rotation, it is possible to keep on rotating the milled nut, thanks to the friction 24 which slides without driving along the cam until the ignition is produced. After use, a rotation in the reverse direction brings back the cam at rest and closes the valve.

Of course, the modes of connection between the milled nut and the cam, on the one hand and between the cam and the valve on the other hand, and also the shape of the cam and its angular displacement are given only by way of example and can be modified without escaping from the scope of the invention which can be adapted, with a suitable adaptation, to all the types of valves used in gas lighters.

Similarly, without escaping from the scope of the invention, it is also possible to bring back the cam at its starting position by other means, without making use of another rotation of the milled nut.

What is claimed is:

1. In a lighter, particularly for smokers, using a combustible gas in a liquefied form, a container to hold said liquefied gas under pressure, a valve mounted on said container to secure a gas passageway, a flint, an axle trunnioned on said container, a milled nut carried by said axle and cooperating with said flint to deliver a spark in the vicinity of the valve, a cam carried by the said axis, a lever pivoted on said container and having one end operatively connected with the valve, a spring arranged on said container to apply the lever against the cam which is shaped to control the opening of the valve by said lever when rotated together with the milled nut.

2. A gas lighter, particularly for smokers, comprising a container intended to contain a liquefied combustible gas, a valve mounted on said container, a guiding tube, a flint arranged to slide in said tube, a spring disposed in said tube to urge the flint towards the outside, a rotary axle trunnioned on the container, transversely to the axis of the guiding tube and above said tube, a milled nut fixed upon said axle and kept into contact with the flint by said spring, the milled nut comprising two lateral grooved flanges having a greater diameter than the milled nut, two parallel flats respectively provided upon the periphery of these two flanges and extending upon about 90°, a lever pivoted on an axis parallel to the axis of the milled nut and arranged below said cam to cooperate with said flanges provided with flats, a spring located on the container below one end of said lever and arranged to urge same against the periphery of said flanges, means through which the other end of the lever controls the opening and the closing of said valve.

3. A gas lighter, particularly for smokers, comprising a container intended to contain a liquefied combustible gas, a valve mounted on said container, a flint, a guiding device for said flint, a rotary axle trunnioned on the container transversely to the guiding device of the flint and above said device, a cylindrical member fixed on said axle to turn with it, a part of this member forming a milled nut and another part of said member having a smaller diameter forming a cam and being provided with a flat, two lateral grooved flanges also mounted on said axis to act as driving devices for the milled nut and the cam, a lever pivoted upon an axis parallel to the axis of the milled nut and disposed to cooperate with said cam, a spring located on the container below one end of said lever and arranged to urge it against said cam and means through which the other end of the lever controls the opening and the closing of the valve.

4. A gas lighter, particularly for smokers, comprising a container intended to contain a liquefied combustible gas, a valve mounted on said container, a flint, a guiding tube for said flint, a rotary axle trunnioned on the container transversely to the axis of the flint containing tube and above said tube, a milled nut fixed upon said axle to turn with it, means to keep the flint applied against said milled nut, a cam freely mounted on said axis, a friction disk disposed between the milled nut and the cam to drive in rotation said cam by means of the milled nut, means to control through said cam the opening and the closing of the valve and abutments provided on the cam to immobilize the cam in its positions corresponding to the opening and the closing of the valve.

5. A gas lighter, particularly for smokers, comprising a container intended to contain a liquefied combustible gas, a valve mounted on said container, a guiding tube, a flint arranged to slide in said tube, a spring disposed in said tube to urge the flint towards the outside, a support constituted by two studs fixed to the container on both sides of the guiding tube of the flint, a transversal axle trunnioned in said studs, a milled nut fixed on said axle near one of the studs and kept in contact with the end of the flint by said spring, a cam freely mounted on said axis near the other stud, a driving device formed by a grooved cylindrical member integral with said axis and disposed between the milled nut and the cam, a blind bore provided in said member and open towards the cam, a spring housed inside said bore, a friction disk slidably mounted, but without being able to rotate, on said disk, disposed at the mouth of said bore and applied by said spring against the cam, means to control the valve of the container through said cam, an abutment fixed on the outer face of said cam to immobilize said cam in the positions for the opening or the closing of said valve, by cooperating with the corresponding stud of the support.

References Cited in the file of this patent
UNITED STATES PATENTS
2,637,990    Aronson _____ May 12, 1953
FOREIGN PATENTS
1,210,565    France _____ Sept. 28, 1959